United States Patent
Shen et al.

(10) Patent No.: US 6,643,040 B2
(45) Date of Patent: Nov. 4, 2003

(54) OPTICAL SIGNAL CONVERTER FROM RZ FORMAT TO NRZ FORMAT

(75) Inventors: Alexandre Shen, Paris (FR); Fabrice Devaux, Montrouge (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/961,311

(22) Filed: Sep. 25, 2001

(65) Prior Publication Data

US 2002/0041408 A1 Apr. 11, 2002

(30) Foreign Application Priority Data

Oct. 5, 2000 (FR) .......................................... 00 12728

(51) Int. Cl.[7] ............................................... G06E 1/00
(52) U.S. Cl. ....................... 359/107; 359/243; 398/189; 341/69
(58) Field of Search ................................. 359/107, 108, 359/237, 243, 184; 341/68, 69; 356/477, 480; 385/1, 2, 3, 14; 398/189

(56) References Cited

U.S. PATENT DOCUMENTS

| 3,889,134 | A | * | 6/1975 | Basham .......................... 327/94 |
| 6,097,529 | A | | 8/2000 | Lee et al. ..................... 359/279 |
| 6,448,913 | B1 | * | 9/2002 | Prucnal et al. ............... 341/137 |

OTHER PUBLICATIONS

H. Kawaguchi, "Bistable laser diodes and their applications: State of the art", IEEE J. Selected Topics in Quantum Elect., vol. 3, No. 5, pp. 1254–1270, Oct. 1997.*
H. Kawaguchi, I. H. White, M. J. Offside,J. E. Carroll, "Ultrafast switching in polarization–bistable laser diodes", Opt. Lett., vol. 17, No. 2, pp. 130–132, Jan. 15, 1992.*
S. Bigo, E. Desurvire, B. Desruelle, "All–optical RZ–to–NRZ format conversion at 10 Gbit/s with nonlinear optical loop mirror", Elect. Lett., vol. 30, No. 22, pp. 1868–1869, Oct. 27, 1994.*
H. Kawaguchi, Y. Yamayoshi, K. Tamura, "All–optical format conversion using an ultrafast polarization bistable vertical–cavity surface–emitting laser", Conf. on Lasers and Electro–optics 2000, Technical Digest TOPS vol. 39, May 7–12, 2000, p 379–380.*
D. Norte, A. E. Willner, "Experimental demonstrations of all–optical conversions between the RZ and NRZ data formats incorporating noninverting wavelength shifting leading to format transparency", IEEE Photonics Tech. Lett., vol. 8, May 1996, p 712–714.*
S. Bigo, et al., Electronics Letters, vol. 30, No. 12, pps. 984–985, "Bit–Rate Enhancement Through Optical NRZ-to–RZ Conversion and Passive Time–Division Multiplexing for Soliton Transmission Systems," Jun. 9, 1994.
H. K. Lee, et al., Electronics Letters, vol. 32, No. 25, pps. 2335–2336, "All–Optical Format Conversion from NRZ to RZ Signals Using a Walk–Off Balanced Nonlinear Fibre Loop Mirror," Dec. 5, 1996.
H. Izadpanah, et al., pps. 74–77, "Clocked Optical Regeneration Using a Diode–Laser Amplifier," Sep. 10, 1989.

* cited by examiner

Primary Examiner—Thong Nguyen
Assistant Examiner—Arnel C. Lavarias
(74) Attorney, Agent, or Firm—Sughrue Mion, PLLC

(57) ABSTRACT

The present invention is a device for converting an RZ signal into a NRZ signal which contains an optical bistable device (5), where an output level of this device passing from a low level to a high level when an input power level crosses in an upward direction a first threshold, and returning to a low level when an input level crosses in a downward direction a second threshold below the first, the output (7) of the bistable (5) carrying the NRZ signal, and a device (2) for converting the RZ signal into a control signal of an output logic level of the optical bistable device (5) receiving the RZ signal, and delivering the control signal of the optical bistable device (5), this signal having a level above the first threshold when the RZ signal passes to 1 and which becomes lower at the second threshold only if the RZ signal passes to 0 and stays there for more than one bit time.

10 Claims, 5 Drawing Sheets

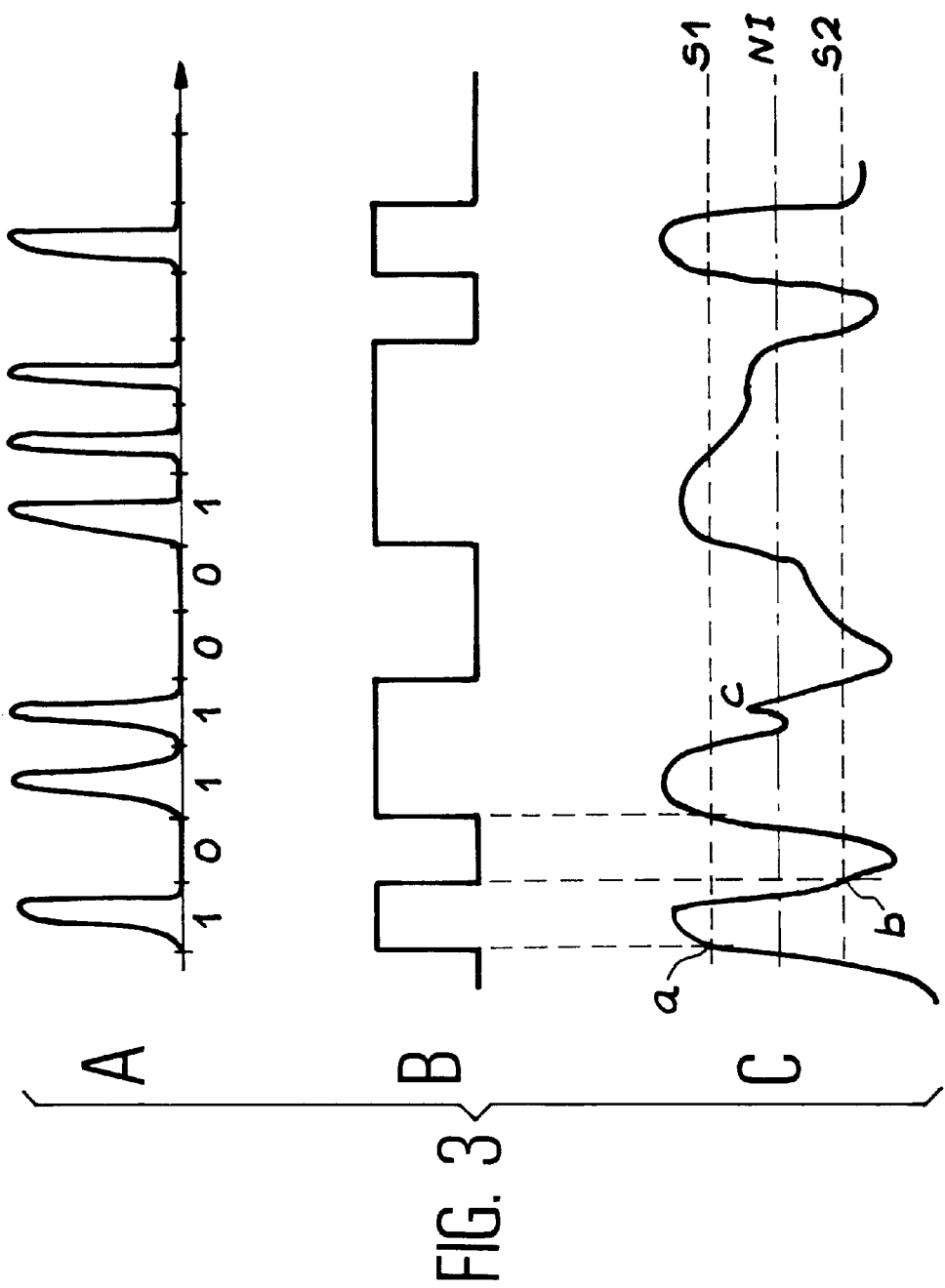

OPTICAL SIGNAL CONVERTER FROM RZ FORMAT TO NRZ FORMAT

TECHNICAL FIELD

The invention is located in the field of converters of optical signals in the return to zero (RZ) format into optical signals in the non-return to zero (NRZ) format.

TECHNOLOGICAL BACKGROUND

It is well known that it is preferable to transmit binary digital—for example telecommunications-signals, in an NRZ format rather than in an RZ format, since NRZ format signals consume less band width, for a same information flow, than RZ format signals.

However some so-called 3R regeneration processes standing for "Reamplification, Reshaping, Retiming" require for example a first conversion from NRZ format to RZ format then a return to NRZ format for retransmission after regeneration. The result is that RZ to NRZ converters are already known.

In most of the known RZ-NRZ converters, broadening pulses representing a 1, of half a bit time in length, in order to convert them into pulses having a length of one bit time is obtained in two phases. Firstly the signal is carried into a dispersive fibre. Given the slight variations in wavelength present in the signal and the different propagation speed in a fibre dispersing these wavelengths, the pulses representing levels 1 are broadened. Then the broadening of the fibre output signal is increased by adding to this first signal a second signal obtained from the initial RZ signal by wavelength conversion, passing through a dispersive fibre and a delay of half a bit time. After the power addition of these two signals of different wavelengths, the resulting signal must pass into a second wavelength converter so that the NRZ output signal comprises only a single wavelength. In these conditions the pulses representing 1's of the initial signal are broadened to a value approximately equal to one bit time in the signal resulting from the addition of the first and second signals.

It can thus be seen that the known method requires an RZ signal distribution occurring on two parallel channels, a wavelength conversion of the signal to be converted on one of the channels, a delay of a half bit time on one of the channels relative to the other channel, an addition of signals present at the output of each of the two channels, and lastly a wavelength reconversion of the signal resulting from this addition so as to have a single wavelength. It should be noted that the wavelength conversion on one of the two channels is necessary to avoid destructive interference between the two signals, in a part where they overlap in time during the addition of the two signals.

BRIEF SUMMARY OF THE INVENTION

The purpose of the invention is to obtain an NRZ signal containing the same information as an initial RZ signal, whose symbols representing "1" have a stable power level, well defined rising edges and falling edges. According to the method used to embody the invention, we obtain a signal converted to the same wavelength as the initial NRZ signal or on the contrary a wavelength converted signal.

The idea underpinning the invention is to use an optical bistable means with hysteresis. Such an optical means has an output power, which varies with the input power in the following way. When the input power increases, the output power of the optical bistable means with hysteresis increases at first slowly then changes level very rapidly with the input power to set itself at a much higher high level as soon as the input power crosses in an upward direction a first threshold. When the output signal of the optical bistable means with hysteresis is at the high level, if the input power reduces, the output power of the optical bistable means with hysteresis starts by reducing slowly then reduces very rapidly with the reduction in input power to set itself at a much lower low level as soon as the input power crosses in a downward direction a second threshold. The second threshold is below the first.

The use according to the invention of this property of the optical bistable means will now be explained.

From the initial RZ signal to be converted is made a control signal of the optical bistable means. This signal is then input into the optical bistable means. This control signal has the following properties. For a transition from a value 0, i.e. from a low logic level lasting more than one bit time, to a value 1 of the initial RZ signal to be converted, the control signal passes from a level below the first threshold S1 to a level above the first threshold. In the same way the output signal of the optical bistable means with hysteresis passes from a low level to a high level. When the initial RZ signal has a sequence of 1's, one after the other, the input signal power level may fluctuate due to the returns to 0 for less than one bit time of the initial signal, but this input signal power level must remain above the second threshold in such a way that the output signal retains the high level. If on the other hand the initial RZ signal returns to 0 and remains there for a time longer than one bit time, which means that the sequence of 1's is finished, then the control signal must have an input level which is set at a level below the second threshold of the optical bistable means with hysteresis then which will remain below the first threshold, so long as the RZ signal remains at the logic level 0. To sum up the invention relates to a device for converting a binary digital optical signal in the RZ format having a flow rate D, and therefore a bit time 1/D, into a binary digital optical signal in the NRZ format with the same flow rate characterised in that it comprises:

an optical bistable means having an input and an output, an output logic level of this optical bistable means passing from a low level to a high level when the power level present at input passes from a level below a first threshold to a level above this first threshold and passing from a high level to a low level when the power level present at input passes from a level above a second threshold to a level below this second threshold, the second threshold being below the first threshold, the output of this optical bistable means carrying the NRZ format signal;

a means for converting the binary digital optical signal in the RZ format into a control signal of an output logic level of the optical bistable means, this conversion means having an input and an output, this means receiving at its input, the RZ signal to be converted and delivering at its output said control signal, said output being coupled to the input of the optical bistable means, the conversion means producing a signal having a level above the first threshold when a signal present at the input of this circuit passes from a low logic level present for more than one bit time to a high logic level, remains at a level above the second threshold so long as the input signal does not return for more than one bit time to a low logic level, and producing a signal having a level below the second threshold when a signal present at the input of this means passes from a high logic level to a low logic level and remains there for more than one bit time.

Examples of embodiments of means of converting an RZ signal into a control signal will be given later.

The bistable means may be a passive means, like for example a microcavity incorporating a saturable absorbent material. In this case the NRZ output signal may or may not be converted in wavelength as the designer chooses. The control signal must have a wavlength whose value is set within one of the windows of transparency of the microcavity, i.e. which is resonant in the microcavity.

The bistable means may also be an active means, like for example a Q switch laser. In this case the NRZ output signal will be converted in wavelength and will be at the wavelength of the Q switch laser.

BRIEF DESCRIPTION OF THE DRAWINGS

Examples of embodiments of the invention will now be commented upon with the help of the appended drawings in which:

FIG. 3 shows the change over time of signals, it comprises parts A, B, C,

DESCRIPTION OF EMBODIMENTS

Figure 1:
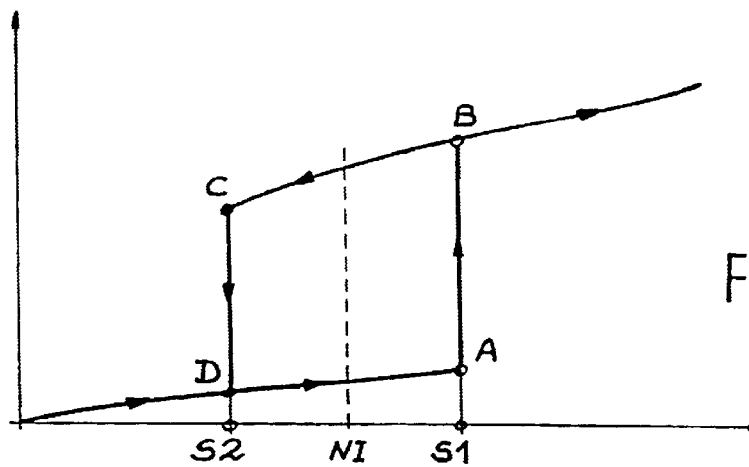
FIG. 1 is a curve intended to explain the operation of an optical bistable means with hysteresis.

FIG. 1 is a curve intended to explain the operation of an optical bistable means with hysteresis. The values of the input powers are carried by the abscissa, and the output values are carried by the ordinate.

As explained above, when the input power increases passing for example from 0 to a first threshold S1, the output power of the optical bistable means with hysteresis increases at first slowly to reach the power having the ordinate of point A, then changes level very rapidly with the input power to set itself at a much higher high level having the ordinate of point B, as soon as the input power crosses in an upward direction a first threshold S1. When the output signal of the optical bistable means with hysteresis is at the high level, if the input power diminishes, the output power of the optical bistable means with hysteresis, starts by reducing slowly, as shown by the curve part joining parts B and C, then reduces very rapidly with the reduction in the input power to set itself at a much lower low level having the ordinate of point D, as soon as the input power crosses in a downward direction the second threshold S2. The second threshold S2 is below the first threshold S1. In FIG. 1 has also been shown an intermediate input level N1 having a value between S1 and S2 the function of which will be explained below.

Figure 2:
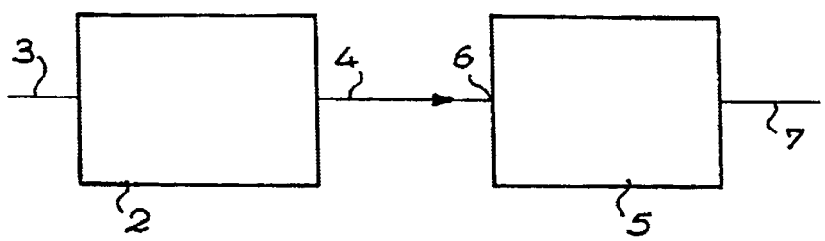
FIG. 2 shows the general embodiment of the invention.

FIG. 2 shows the general embodiment of the invention. In this figure has been shown by blocks 2 and 5 respectively a means 2 of converting the binary digital optical signal in RZ format into an optical control signal of a logic output level of the optical bistable means 5, and the optical bistable means 5 with hysteresis. The conversion means 2 has an input 3 receiving the RZ signal to be converted and an output 4 delivering said control signal. The output 4 is coupled directly as shown in FIG. 2 or by means of level adaptation means, known per se but not shown in FIG. 2, to the input 6 of the optical bistable means 5. The level adaptation means may include, for example, an amplifying means or an attenuating means or again a combination of these two means arranged in series one relative to the other. The amplifying means may for example be a semi-conductor amplifier (SOA) or again an erbium doped fibre amplifier (EDFA).

As explained above the conversion means 2 produces from the RZ signal having a level above the first threshold S1 when the signal present at input 3 passes from a logic level 0 to a logic level 1, and produces a signal having a level below the second threshold S2 when the RZ signal present at input 3 passes from a logic level 1 to a logic level 0 and remains there for more than one bit time.

The operation of the device shown in FIG. 2 will now be explained with reference to FIG. 3. FIG. 3 shows the change in time of signals, it comprises parts A, B, C.

Part A shows an arbitrary RZ format signal present at input 3 of the means 2. In the example shown the signal takes successively the values 1, 0, 1, 1, 0, 0, 1, 1, 1, 0, 1. Each 1 is represented by a pulse of less than one bit time in length, embodied by the space between two graduations on the time axis. The signal shown in part B is the NRZ signal corresponding to the RZ signal shown in part A. This time the 1's are represented by optical signals retaining a high level throughout the full duration of one bit time. When several consecutive 1's follow each other the signal remains at the high level without a return to 0, i.e. without return to the low logic level. Part C shows an example of the control signal which should be obtained at output 4 of the signal conversion means 2 in order to get at output 7 of the optical bistable means 5 the signal shown in part B.

When the RZ signal first passes to 1, the bistable output must switch to the high logic level. For this to happen the power value of the control signal present at input 6 of the optical bistable means 5 must exceed the threshold S1 shown by a dotted horizontal line marked S1. This is what is shown as a in part C, where it can be seen that a vertical dotted line marks the time coincidence of the rising edge of the NRZ signal shown in B, and of the crossing in an upward direction of the power level S1 by the control signal shown in C. The bistable output signal remains at the high level so long as the input signal remains above the level S2 shown by a horizontal dotted line marked S2. As the next value of the RZ signal is a 0, the control signal must pass below the threshold S2 at the end of the bit time of the first bit. This is what is shown as b in part C. The RZ signal then switches back twice in succession to 1. This means that the control signal must switch back above the threshold S1 at the end of the bit time of the second bit and then remain above the threshold S2 for the duration of two bit times. It should be noted that it is not important for the control signal to fluctuate, as shown in c, provided it remains above the threshold S2. Preferably in the embodiments efforts will be made to ensure that between the high threshold S1 and the low threshold S2, the control signal retains a level close to an intermediate level N1 between S1 and S2. Preferably in the embodiments, efforts will be made to ensure a lowest level of the control signal, which is close to 0.

Figure 4:
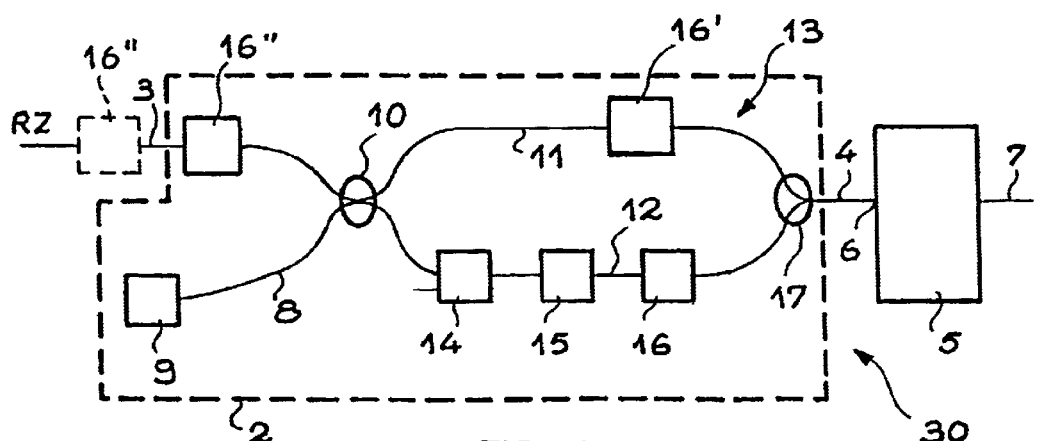
FIG. 4 shows an embodiment of the invention intended to illustrate a first embodiment of the means of converting the binary digital optical signal in RZ format into a control signal.

A first embodiment of the signal conversion means 2 will now be commented upon in relation to FIG. 4 which shows a device 30 according to the invention in which the means 2 is given in detail. The means 2 comprises an input 3 for an RZ signal to be converted and an input 8 for a continuous optical wave CW. The input 8 may itself be supplied by a source 9 of a continuous optical wave CW. If it is required for the RZ signal to be converted to NRZ without wavelength conversion, it is preferable for the CW source 9 to be at the same wavelength as a carrier wave of the RZ signal to be converted and to this end for the source 9 to be preferably a device for carrier wave recovery from the RZ signal. Such recovery devices are known and will not therefore be described here.

Figure 5:
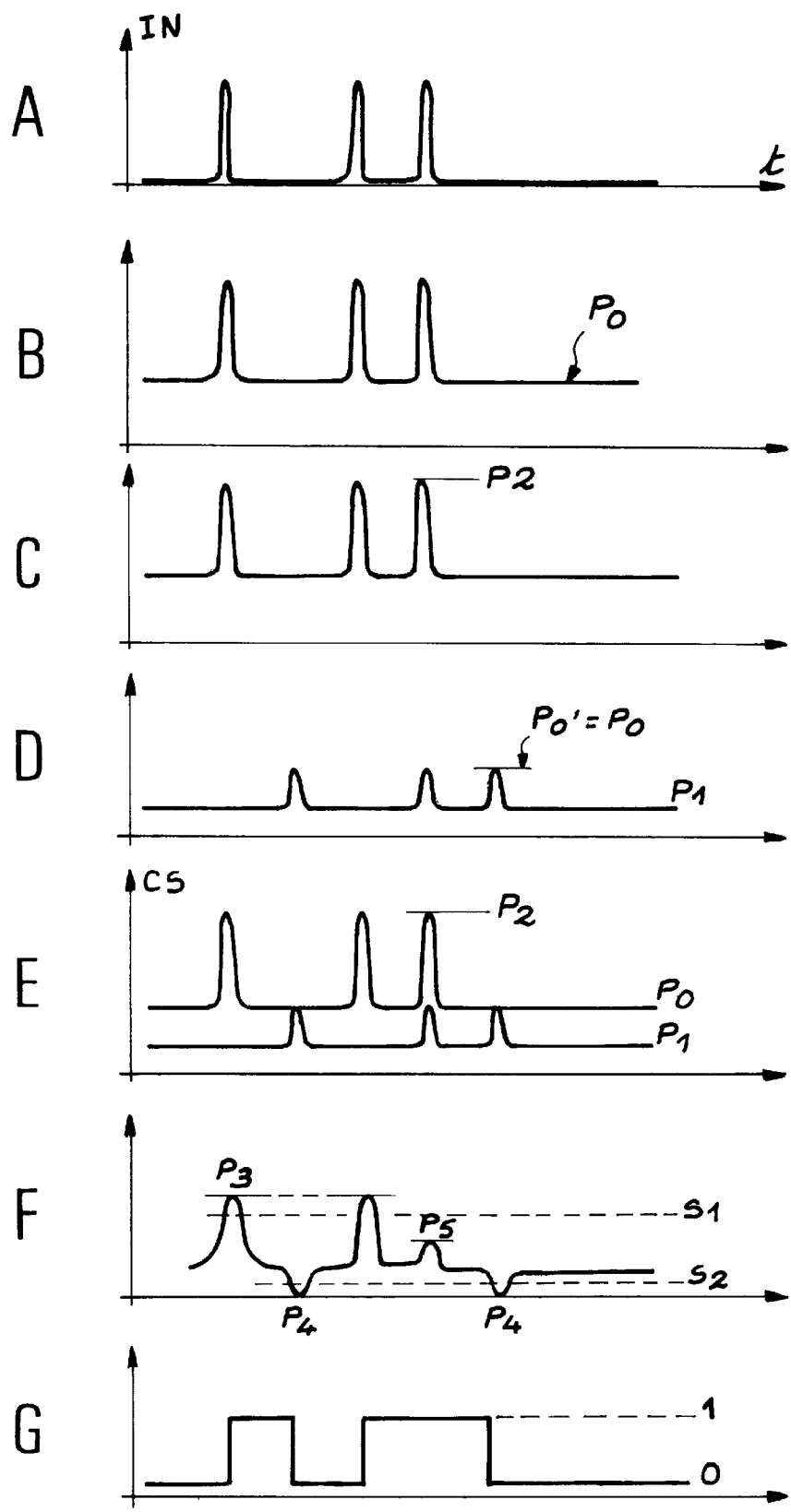
FIG. 5 shows the change over time of signals present at different positions of the device shown in FIG. 4, it comprises parts A to G.

The RZ signal present at input 3 and the wave CW present at input 8 are both introduced, for example by means of a 3 db coupler 10, on the two arms 11, 12 of a Mach-Zehnder intefferometer 13 for example. Either arm 11, 12 of the interferometer comprises a retard means 14 to introduce a delay of a one bit time in duration relative to the other arm, a phase adjustment means 15 of one of the waves present in the arm comprising the means 15, a power level adjustment means 16 of one of the waves present in the arm comprising the means 16. In the example shown in FIG. 4 the means 14, 15, and 16 are on the same arm 12. It will be seen below that given the operation of the means 2, it is of little concern whether each of the means 14–16 is on one or other arm. They can be shared between the two arms in all possible combinations. Likewise the order of means 14–16 on one of the arms is immaterial in respect of the operation. Preferably the arm not comprising the power level adjustment means 16 will also comprise a power level adjustment means 16'. A power level adjustment means 16" may also be present as a supplement to or instead of the means 16', on the channel of the input 3 upstream of the coupler 10. The presence of the means 16' or 16" or again 16' and 16" makes it possible to adjust more easily the relevant power level in each of the arms 11, 12 so as to obtain a better extinction ratio during interference of the signals present in each of the arms. The arms 11 and 12 of the interferometer 13 are coupled by means of a second, 3 db for example, coupler 17, on the output 4 of the interferometer 13, which constitutes the output of the means 2. This output 4 is coupled as shown above on the output 6 of the optical bistable means 5. The operation of the means 2 as shown in FIG. 4 will now be commented upon in relation to FIG. 5. This figure comprises parts A to G.

Part A of this figure shows the start of the same RZ signal as part A in FIG. 3. Parts B and C show this same signal in each of the arms 11, 12 of the interferometer 13 without taking into account, for this representation, the presence of the means 14–16, but only of a change of value of the continuous component. This change of value is due to the input into each of the arms 11, 12 of the continuous wave coming from the means 9. Given the simultaneous presence of the continuous wave present at the input 8 and of the RZ signal present at the input 3 the signals shown in B and C have the same form as the incoming RZ signal, but offset in an upward direction from $P_0$ showing in each of these arms the level of the continuous wave CW coming from the source 9. The fact that the level $P_0$ is the same in the two arms 11 and 12 implicitly implies that the coupler 10 is a 3 db coupler. Naturally the designer has the choice of coupling and can also use an attenuator or an amplifier to obtain different continuous levels in each of the arms. The high level of the signal shown in B or C is a level P2 higher than $P_0$. The signal shown in part D represents the signal present in one of the arms 11, 12 carrying the delay means 14. It can be seen that the signal shown in D has the same form as the signal shown in C but offset in time by one bit time. Moreover the high and low levels of the signal are offset by the presence of the power level adjustment means 16. In the preferred embodiment, the higher level $P_0'$ of the signal shown in D is adjusted so that this level $P_0'$ is equal to the level of the signal $P_0$ shown in C. The low level of the signal shown in D is a level P1 lower than $P_0$. The signals shown in C and D are shown together in part E for the first five bits of the RZ signal shown in part A. The phase adjustment means 15 is adjusted to prompt a destructive interference between the signals present on each of the arms 11, 12, i.e. between the two signals shown in part E.

The signal resulting from the destructive interference of the signals shown separately in C and in D and together in E, is shown in F.

During the first bit time, the level P3 of the signal resulting from the destructive interference has the level P2 reduced by level P1. This level P3=P2−P1 is above the first threshold S1 in such a way that the outgoing signal from the optical bistable means 5 passes to the high level (1) shown in G. On the other hand during the interference corresponding to the second bit time the level P4 of the signal resulting from the destructive interference has the level $P_0$ reduced by the level ($P_0$−P1), this is conveyed in respect of the resulting level of the output signal by a shadow pulse, i.e. a very low light level P4. The level P4 is below the threshold S2 in such a way that the output signal of the optical bistable means shown in G passes from the high logic level (1) to the low logic level (0). The result of the preferred choice $P_0=P_0'$ obtained by means of the adjustment means 16 and possibly 16' or 16" is that the level P4 is zero or almost zero, if the extinction ratio adjusted by the phase adjustment means 15 is sufficiently high. At the third bit time we return to the configuration of the first bit time and the resulting signal level is again at the level P3 above the first threshold, in such a way that the output signal of the optical bistable means 5 again passes to the high logic level. At the fourth bit time the signal shown in D has the level $P_0$. It follows, that during the interference corresponding to the fourth bit time the level P5 of the signal resulting from the destructive interference has the level P2 reduced by the level $P_0$. If the level P5 has a level above the low threshold S2 of the optical bistable means 5 the output level of this optical bistable means 5 will retain the high level.

Thus it can be seen that the control signal present at output of the means 2 shown in FIG. 4, amply fulfils the desired function if:

the level resulting from the destructive interference between signals C and D offset by one bit time present in each of the arms 11, 12 respectively, immediately upstream of the coupler 17 is above the first threshold S1 when the signal present in the first arm is at its highest level P2 and when the signal present in the second arm is at its lowest level P1, this signal remains at a level P5 above the second threshold S2, when the signal present in the first arm is at the highest level P2 and when the signal present in the second arm is also at its highest level $P_0$, and if, the level resulting from the destructive interference between signals offset by one bit time present in each of the arms 11, 12 is below the second threshold S2 when the signal present in the first arm is at its lowest level $P_0$ and when the signal present in the second arm is its highest level $P_0$ also in the example selected for the explanations.

Thus according to this embodiment of the invention:

the RZ signal to be converted is duplicated to obtain two RZ signals, a first and a second, containing the same information and at the same flow rate as the RZ signal to be converted, to the RZ signal to be converted before separation or to each of the first and second separate RZ signals is added directly a continuous background to obtain first and second signals with increased continuous background level. In the event of the continuous backgrounds being added after separation, the continuous powers added to each of the separated signals may be different from each other, a delay is created of one bit time in the second signal with increased continuous background level relative to the first signal with increased continuous background level, the high and low power levels of the first and second signals with increased continuous background level are adjusted to values such that on achieving a destructive interference between the first signal with continuous background level and the second delayed signal with increased continuous background level the resulting output signal has a level:

above the first threshold when the first signal with increased continuous background level and the second delayed signal with increased continuous background level are respectively at a high level and at a low level, which remains above the second threshold when the first signal with increased continuous background level and the second delayed signal with increased continuous background level are both at high levels and below the second threshold when the first signal with increased continuous background level and the second delayed signal with increased continuous background level are respectively at a low level and at a high level.

The low level of the first signal with increased continuous background level is obtained by adjusting the level of the continuous wave input into the arm 11. The high level of this signal is obtained by adjusting the high level P2 with the power adjustment means 16' or 16". The high level $P_0'$ of the delayed signal is obtained by adjusting the level of the continuous wave input into the arm 12 by action on the power adjustment means 16;

a destructive interference is created between the first signal with increased continuous background level and the second delayed signal with increased continuous background level thus obtaining the control signal by adjusting the phase between the first signal with increased continuous background level and the second delayed signal with increased continuous background level with the phase adjustment means 15.

Figure 6:
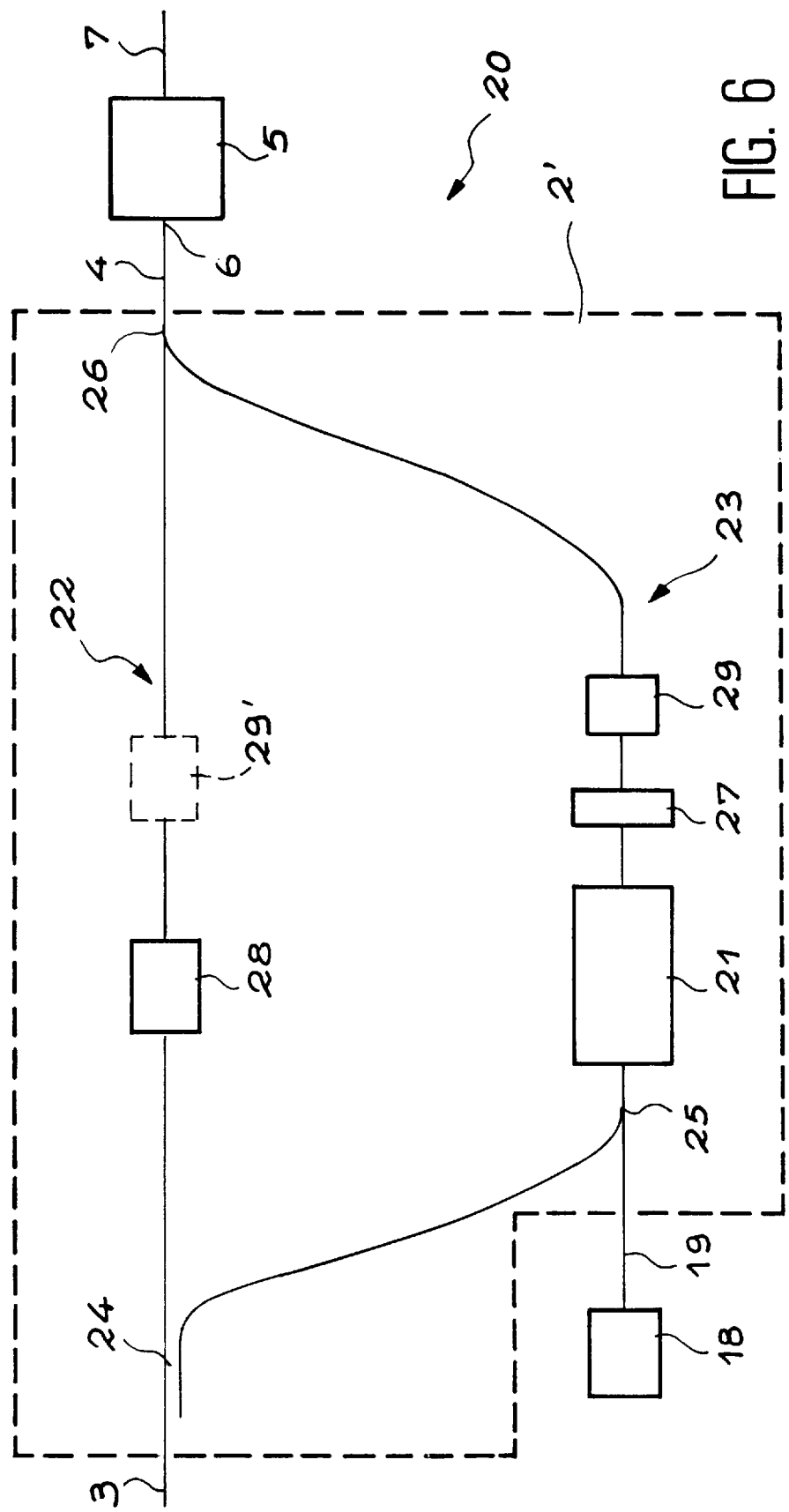
FIG. 6 shows an embodiment of the invention intended to illustrate a second embodiment of the means of converting the binary digital optical signal in RZ format into a control signal.

A second embodiment 20 of the device according to the invention showing another embodiment 2' of the means 2 will now be commented upon with reference to the FIG. 6.

The device 20 comprises a means 2' for producing a control signal comprising a input 3 for an RZ signal to be converted to NRZ carried by a carrier optical wave having a first wavelength. It also comprises an input 19 for a continuous wave having a second wavelength, different from the first, coming for example from a laser diode 18. The RZ signal present at input 3 is coupled by a first, 3 db for example, coupler 24, to two optical channels, a first 22 and a second 23. The second channel 23 comprises a connection 25 for example a 3 db coupler making it possible to receive on this channel 23 the continuous wave coming from the input 19. The first channel 22 comprises a delay means 28 the function of which is to input an optical path difference between the two arms 22, 23 equal to one bit time. The second channel 23 is fitted with a gain saturation device 21, for example a semiconductor optical amplifier. Such a device has, in a known way, a gain value as a function of the input power which is constant so long as the input power value is below a so-called saturation threshold, then decreasing when the input power exceeds the saturation threshold. In the means 2', it will be seen that input power values are used making it possible to exploit the decreasing part of the gain characteristic. A filter 27 present on the channel 23 downstream of the amplifier 21 makes it possible to eliminate the signal at the first wavelength while letting past the signal at the second wavelength coming from the input 19. The second channel 23 may comprise downstream of the gain saturation device 21 in series with the filter 27 a power level adaptation means 29 for example an attenuator or an amplifier. As in the device 2 described in connection with FIG. 4, a power level adaptation means 29' for example an attenuator or an amplifier shown in dotted lines, placed on the channel not comprising the level adaptor 29, allows adaptation of the relative level of the signals present in the first 22 and second 23 channels to be facilitated. The signals coming from channels 22 and 23 are brought together on channel 22 by a 3 db coupler 26. The control signal is present on the output 4 of the means 2' located downstream of the connection 26.

Figure 7:
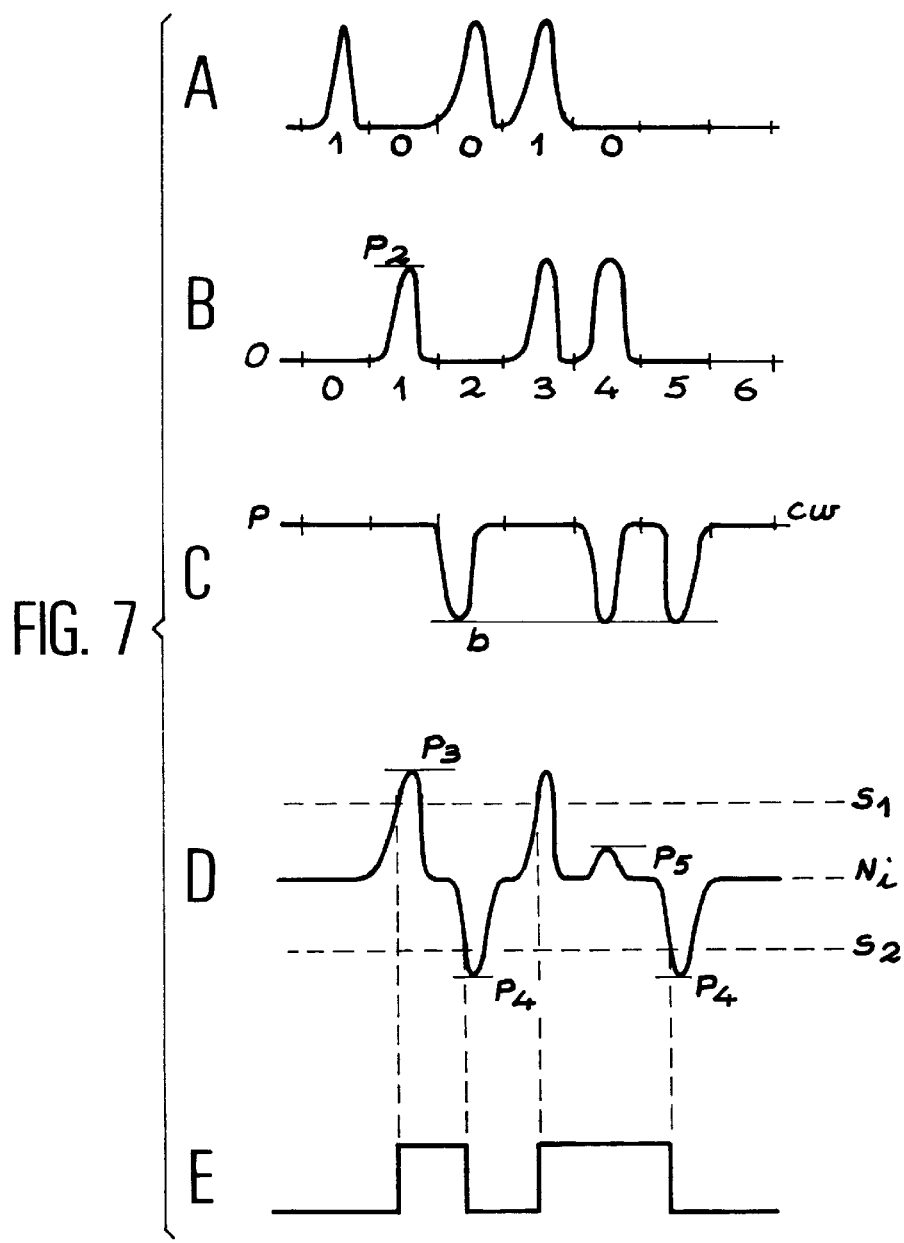
FIG. 7 shows the change over time of signals present at different positions of the device shown in FIG. 6, it comprises parts A to E.

The operation of the means 2' will now be explained in connection with FIG. 7. Part A of this figure shows an RZ signal present at input 3 of the means 2'. So as not to have to repeat descriptions already given this signal resumes the same sequence of 1 and of 0 as that shown by parts A in FIGS. 3 and 5. Parts B and C in FIG. 7 show the signals present in each of the channels 22, 23 respectively immediately upstream of the coupler 26. A delay 28 present on one of the channels 22, 23 makes it possible to obtain a delay of one bit time of the signal present in channel 23 relative to the signal in channel 22. The example shown in FIG. 6 implicitly implies that the propagation time on channel 22 is shorter than the propagation time on channel 23. This point will be reviewed after the commentary of part C which shows the signal present downstream of the gain saturation device 21 immediately upstream of the coupler 26. It should be remembered that the part of the characteristic of the device 21 is used where the gain is decreasing. For this the power of the continuous wave input on channel 23 via the input 19 is adjusted so that the saturation level is reached either by the continuous wave level, or at least by the increased continuous wave level of the level reached by the RZ signal when this signal has the high logic level. In these conditions each pulse corresponding to a high level of the RZ signal, will be converted by the gain saturation phenomenon into a shadow pulse, i.e. by a pulse having a lower luminous power level than the level of the continuous wave input on the arm 19. Thus the high level of the signal shown in C has a luminous power level as a function of the power of the continuous wave. The level of this continuous wave may be adjusted by the level adjustment means 29. The continuous wave level is reduced to reach a shadow level shown by the level b, for each high level pulse of the RZ signal.

The high level of the signal shown in B can be adjusted by the level adjustment means 29'. The low level of the signal shown in B is 0 or close to 0.

The signal shown in C is delayed by one bit time relative to the signal shown in B. This delay is obtained as explained above by the delay 28 placed in one or other channel 22, 23. The position of the delay 28 on the channel 22 or the channel 23 and its value are determined by this objective.

The addition of the signals coming from each of the channels 22 and 23 effected by the coupler 26 has the form of the signal shown in D in FIG. 7, i.e. the form wanted for the control signal. This signal is present at output 4 of the means 2' for converting the binary digital optical signal in RZ format into a control signal. The function of the level adapter 29 is to set the lowest values to be reached by the control signal at a level below the second threshold S2. This lowest level shown by P4 in part D results from the addition of the low level of the signal shown in B (close to 0) and of the low level of the signal shown in C, (level of the continuous wave adjusted by the means 29 reduced by the effect of the gain saturation amplifier 21 when the signal shown in B is at the high level). Preferably this lowest level P4 is close to 0, which implies that the low levels of the signal shown in B and of the signal shown in C are both close to 0.

The high level P3 of the control signal shown in D is above the first threshold S1. This level results from the addition of the high level P2 of the signal shown in B and of the high level CW of the signal shown in C. The high level of the signal shown in C is the level of the continuous wave input on channel 23. This high level, and therefore the sum of the high levels can be adjusted by the means 29. Naturally, it is also possible, as already indicated to provide upstream or on the channel 22, a level adaptation means 29' to modify the high values of the signal shown in B, and therefore the highest values P3 of the control signal.

An intermediate level P5 of the signal shown in D corresponds to the sum of a high level P2 of the signal shown in part B of FIG. 7 and of a simultaneous low level b of the signal shown in C in FIG. 7. The level P5 is set at a level below the first threshold S1 and above the second threshold S2. This latter case occurs as explained above when the offset RZ signal shown in B comprises several consecutive 1's, which implies returns to 0 of the RZ signal, but for a time of less than one bit in duration.

Thus according to this embodiment:

from the RZ signal to be converted are created two RZ signals;

one of the two RZ signals is delayed relative to the other by one bit time a continuous level is added to the delayed signal relative to the other and an increased delayed signal is obtained;

the pulses corresponding to an increase in the luminous power of the increased delayed signal are replaced by shadow pulses corresponding to a reduction in the luminous power so as to obtain a converted delayed signal; in the example shown using a gain saturation amplifier 21, the converted delayed signal is shown in part C of FIG. 7;

high and low power levels of the delayed and converted delayed signals are adjusted to values such that by effecting an addition of the power levels of the delayed and converted delayed signals, the resulting signal has:

a level above the first threshold S1, when the delayed signal and the converted delayed signal are both at high levels, level which remains above the second threshold S2 when the delayed signal and the converted delayed signal are at high and low levels respectively, a level below the second threshold when the delayed signal and the converted delayed signal are both at low levels; this adjustment of levels is obtained in the example commented upon by adjusting the high level of the delayed signal by the means 29', the high level of the converted delayed signal by action on the level of the continuous wave input on the channel 23, by the means 29, the adjusted power levels of the RZ signal to be converted and of the converted delayed RZ signal are added together thus obtaining the control signal;

the control signal is applied to a bistable device taking a high output level when the input level is above a first threshold S1, and retaining this high level so long as the input level is above a second threshold S2 below the first threshold S1, and taking a low output level if the input level falls below the second threshold S2 then retaining this low level so long as the input level remains below the first threshold S1, thus obtaining at the output of the bistable circuit the NRZ signal carrying the same information as the RZ signal to be converted.

The NRZ signal resulting from the conversion is shown in part E in FIG. 7. The changes of logic level of the NRZ signal resulting from the conversion correspond to the instants when the control signal crosses the threshold S1 or S2. These moments are embodied by vertical dotted lines.

What is claimed is:

1. A device for converting a binary digital optical signal in the RZ format having a bit time into a binary digital optical signal in the NRZ format characterized in that it comprises:

an optical bistable means having an input and an output, an output logic level of this optical bistable means passing from a low level to a high level when a power level present at input passes from a level below a first threshold S1 to a level above this first threshold S1 and passing from a high level to a low level when the power level present at input passes from a level above a second threshold to a level below this second threshold, the second threshold being below the first threshold, the output of this optical bistable means carrying the NRZ format signal;

a means for converting the binary digital optical signal in the RZ format into a control signal of an output logic level of the optical bistable means, this conversion means having an input and an output, this means receiving, at its input, the RZ signal to be converted and delivering at its output said control signal, said output being coupled to the input of the optical bistable means, the conversion means producing a signal the level of which becomes above the first threshold when a signal present at the input of this circuit passes from a low logic level present for more than one bit time to a high logic level and remains at a level above the second threshold so long as the input signal does not return for more than one bit time to a low logic level, and producing a signal having a level below the second threshold when a signal present at the input of this means passes from a high logic level to a low logic level and remains there for more than one bit time.

2. A conversion device according to claim 1, characterized in that the means for converting the binary digital optical signal in RZ format into a control signal of an output logic level of the optical bistable means, comprises an interferometer having two arms each receiving the RZ signal to be converted and a continuous optical wave, one of the arms comprising a delay means to provide by optical path difference a delay of one bit time in one arm relative to the other, the output signal of the interferometer constituting the control signal.

3. A conversion device according to claim 2, characterized in that the means for converting the binary digital optical signal in RZ format into a control signal comprises on at least one of the arms of the interferometer a phase adjustment means or a level adjustment means for a light wave passing through them.

4. A conversion device according to claim 1, characterised in that the means for converting the binary digital optical signal in RZ format into a control signal comprises two channels, a first and a second, the first receiving the RZ signal to be converted, the second receiving the RZ signal to be converted and a continuous wave having a wavelength different from the wavelength of a carrier wave of said RZ signal, this second channel comprising a filter letting through the waves having the wavelength of the continuous wave and stopping the waves having the wavelength of the RZ signal carrier, one of the channels comprising a means of delaying a wave passing through it to input an optical path difference of one bit time of one channel relative to the other, the two channels being brought together upstream of the output of the conversion means on a single channel.

5. A wholly optical process of converting an RZ signal carried by an optical carrier wave having a first wavelength into an optical NRZ signal, characterized in that the process comprises:

outputting a logic level from an optical bistable means, wherein said output passes from a low logic level to a high logic level when an input power is above a first threshold S1 and passes back to a low logic level when the input power goes back down to a level below a second threshold S2 below the first threshold, converting the RZ signal to be converted into a control signal of the bistable means, wherein the control signal passes from a value below the first threshold to a value above the first threshold each time that the RZ signal passes from a low logic level present for more than one bit time to a high logic value, and to a value below the second threshold if the RZ signal to be converted passes from a high logic level to a low logic level and remains there for more than one bit time of the RZ signal, and applying the control signal to the bistable device to obtain at the output from the bistable circuit the NRZ signal carrying the same information as the RZ signal to be converted.

6. A process according to claim 5, characterized in that for the conversion of the RZ signal into a control signal:

duplicating the RZ signal to be converted to obtain two RZ signals, a first and a second, containing the same information and at the same flow rate as the RZ signal to be converted, adding to the RZ signal to be converted before separation or to each of the first and second separate RZ signals a continuous background so as to obtain first and second signals with increased continuous background level, creating a delay of one bit time in the second signal with increased continuous background level relative to the first signal with increased continuous background level, adjusting the high and low power levels of the first and second signals with increased continuous background level to values such that on achieving a destructive interference between the first signal with continuous background level and the second delayed signal with increased continuous background level the resulting output signal has a level:

above the first threshold when the first signal with increased continuous background level and the second delayed signal with increased continuous background level are respectively at a high level and at a low level, which remains above the second threshold when the first signal with increased continuous background level and the second delayed signal with increased continuous background level are both at high levels and below the second threshold when the first signal with increased continuous background level and the second delayed signal with increased continuous background level are respectively at a low level and at a high level.

7. A process according to claim 5, characterised in that for the conversion of the RZ signal into a control signal:

creating, from the RZ signal to be converted, two RZ signals one of which is delayed relative to the other by one bit time;

adding a continuous level to the signal delayed relative to the other and an increased delayed signal is obtained;

replacing the pulses corresponding to an increase in the luminous power of the increased delayed signal by shadow pulses corresponding to a reduction in the luminous power so as to obtain a converted delayed signal;

adjusting high and low power levels of the delayed and converted delayed signals to values such that by effecting an addition of the power levels of the delayed and converted delayed signals, the resulting signal has:

a level above the first threshold S1, when the delayed signal and the converted delayed signal are both at high levels, a level which remains above the second threshold S2 when the delayed signal and the converted delayed signal are at high and low levels respectively, a level below the second threshold when the delayed signal and the converted delayed signal are both at low levels, the power levels of the RZ signal to be converted and of the converted delayed RZ signal are added together thus obtaining the control signal.

8. A device for converting a binary digital optical signal in the RZ format having a bit time into a binary digital optical signal in the NRZ format characterized in that it comprises:

an optical bistable means having an input and an output, an output logic amplitude of this optical bistable means passing from a low amplitude to a high amplitude when a power amplitude present at input passes from an amplitude below a first threshold S1 to an amplitude above this first threshold S1 and passing from a high amplitude to a low amplitude when the power amplitude present at input passes from an amplitude above a second threshold to an amplitude below this second threshold, the second threshold being below the first threshold, the output of this optical bistable means carrying the NRZ format signal;

a means for converting the binary digital optical signal in the RZ format into a control signal of an output logic amplitude of the optical bistable means, this conversion means having an input and an output, this means receiving, at its input, the RZ signal to be converted and delivering at its output said control signal, said output being coupled to the input of the optical bistable means, the conversion means producing a signal the amplitude of which becomes above the first threshold when a signal present at the input of this circuit passes from a low logic amplitude present for more than one bit time to a high logic amplitude and remains at an amplitude above the second threshold so long as the input signal does not return for more than one bit time to a low logic amplitude, and producing a signal having a amplitude below the second threshold when a signal present at the input of this means passes from a high logic amplitude to a low logic amplitude and remains there for more than one bit time.

9. A conversion device according to claim 8, characterized in that the means for converting the binary digital optical signal in RZ format into a control signal of an output logic amplitude of the optical bistable means, comprises an interferometer having two arms each receiving the RZ signal to be converted and a continuous optical wave, one of the arms comprising a delay means to provide by optical path difference a delay of one bit time in one arm relative to the other, the output signal of the interferometer constituting the control signal.

10. A conversion device according to claim 9, characterized in that the means for converting the binary digital optical signal in RZ format into a control signal comprises on at least one of the arms of the interferometer a phase adjustment means or an amplitude adjustment means for a light wave passing through them.

* * * * *